July 11, 1944.  O. C. RITZ-WOLLER  2,353,588
SUPPORTING ARM FOR REAR VIEW MIRRORS AND THE LIKE
Filed Dec. 24, 1942  2 Sheets-Sheet 1

Inventor:
Oliver C. Ritz-Woller
By: Bair & Freeman
Attorney

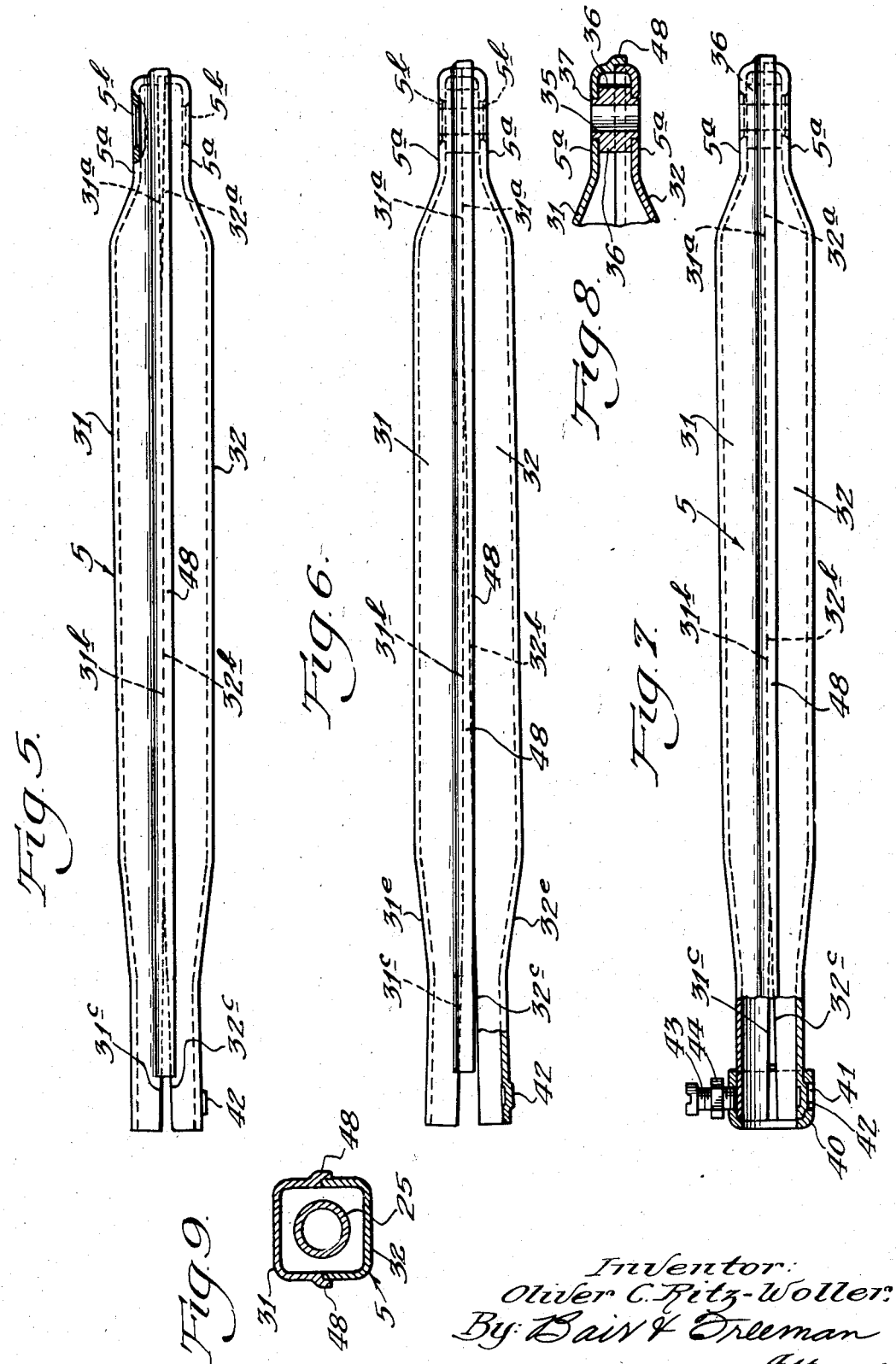

Patented July 11, 1944

2,353,588

UNITED STATES PATENT OFFICE 2,353,588

SUPPORTING ARM FOR REARVIEW MIRRORS AND THE LIKE

Oliver C. Ritz-Woller, Chicago, Ill.

Application December 24, 1942, Serial No. 470,013

1 Claim. (Cl. 248—279)

This invention relates to supporting structures of the type for rear vision mirrors and the like, which are adapted for use on vehicles, such as trucks, buses and the like. Structures of this type are usually mounted in a position on the cab, or other convenient part of the vehicle, so as to enable the driver to conveniently obtain clear rear view vision, alongside and rearwardly of the vehicle, for guidance in the safe maneuvering of the vehicle.

Supporting structures of this general class usually include a supporting arm, having one end suitably connected to a mounting bracket or fixture in a manner to provide for universal adjustment, in order to permit disposition of the mirror in a proper lateral and vertical plane to best suit the convenience of the driver of the vehicle.

One of the objects of this invention is to provide an improved supporting arm of the character indicated, characterized by the provision of a pair of cooperating, stamped, sheet metal elements of generally semi-tubular cross section, and wherein one of the elements of the arm is provided at opposite sides with longitudinally extending marginal portions adapted to lap the joint formed by the two elements when disposed in cooperating relation.

Another object is to provide an improved supporting arm of generally tubular form made up of two semi-tubular elements adapted to be disposed in cooperating relation to form a hollow tubular body, and wherein one of the elements is formed to interlock with the other in a manner to obtain increased rigidity, and which serves to readily absorb lateral strains tending to separate the arm elements in the direction of the plane of their connection.

A further object is to provide an improved supporting arm of generally tubular form composed of two sheet metal stampings of generally semi-tubular cross section, constructed as to permit utilizing relatively light weight sheet metal, affording relatively high strength and rigidity and which are capable of being quickly and easily assembled and economically manufactured.

Other objects and advantages of this invention will be apparent from the following description taken in connection with the accompanying drawings, in which.

Figure 1:
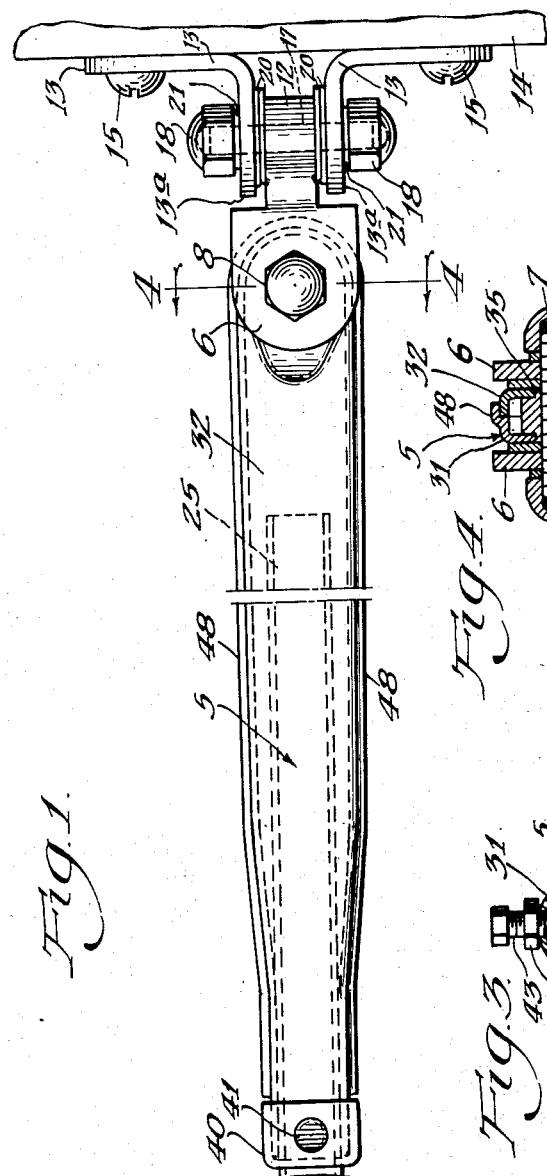
Figure 1 is a view in side elevation of a supporting arm structure shown attached to a mounting, and embodying the present invention.
Figure 3:
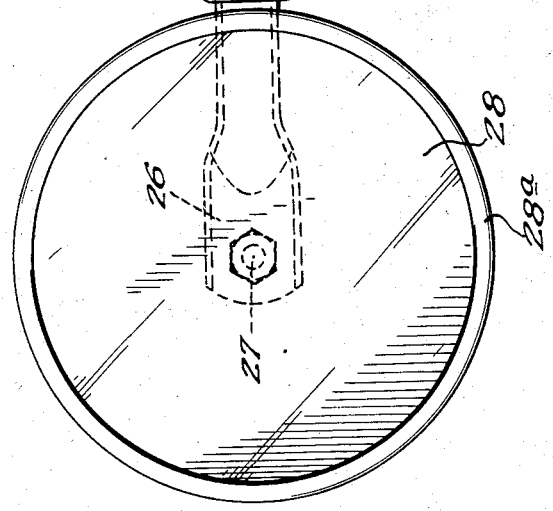
Figure 3:
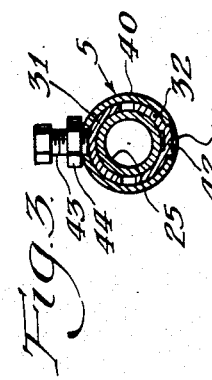
Figure 4:
Figure 2:
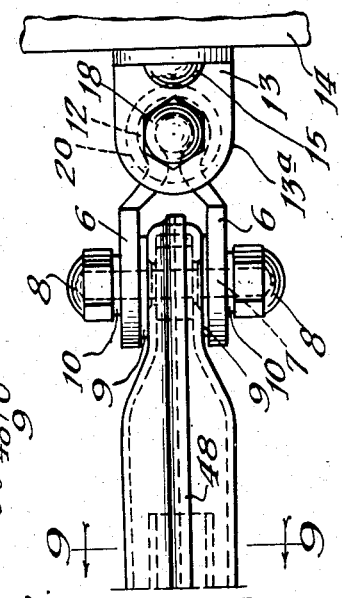
Figure 2 is a top plan view.
Figure 2:
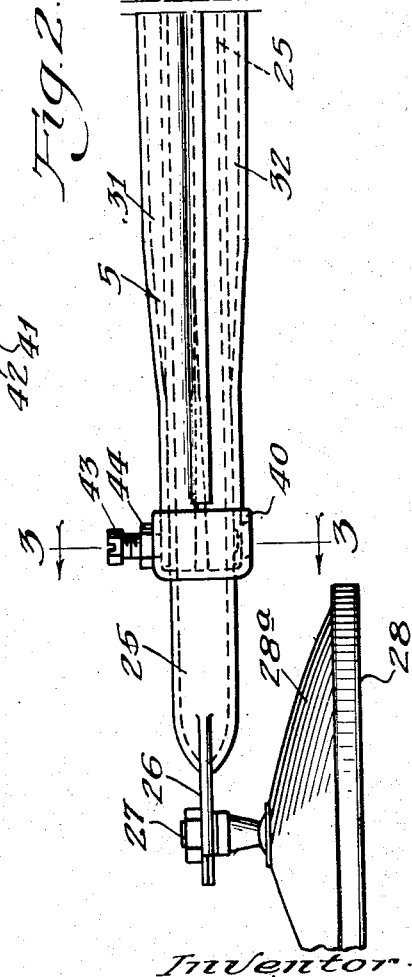

Figures 3 and 4 are transverse, sectional views through the supporting arm taken substantially as indicated at lines 3—3 and 4—4 on Figures 2 and 1 respectively;

Figure 5 is a plan view of the two cooperating semi-tubular elements, comprising the supporting arm, shown in relation to each other, prior to connecting together;

Figure 6 is a view similar to Figure 5, but showing the mounting end of the two semi-tubular arm elements permanently connected together;

Figure 7 is a view in side elevation of the complete assembled arm, with portions broken away to illustrate the manner of connection of the free ends of the arm elements by means of a locking collar;

Figure 8 is a fragmentary, transverse, sectional view through the pivot end of the assembled supporting arm; and Figure 9 is a transverse, sectional view through the arm, taken substantially as indicated at line 9—9 on Figure 2.

The supporting structure embodying the present invention, as illustrated in the drawings, includes a tubular arm indicated generally at 5, having one end flattened to provide a pair of closely, spaced apart substantially parallel faces 5a adapted to be mounted between a pair of spaced apart lugs 6 of a universal mounted bracket. The flattened faces 5a are provided with aligned apertures 5b adapted for registration with correspondingly aligned apertures formed in the lugs 6. The arm is pivotally connected between the lugs 6 by means of a threaded stud 7 provided with nuts 8 at its opposite ends. Interposed between the flattened faces 5a of the arm and the inner surfaces of the lugs 6 are friction washers 9, and between the nuts 8 and the outer surfaces of the lugs 6 are spring washers 10. When the stud 7 and nuts 8 are adequately tightened, the supporting arm 5 together with the supporting elements carried thereby, are frictionally retained in any desired vertical position of adjustment about the horizontal pivot axis formed by the connection of the arm to the lugs 6.

The lugs 6 are connected together at their rear end by a substantially closed, generally tubular body member 12, mounted between a pair of spaced apart angle-shaped brackets 13, which are rigidly secured to a mounting, as indicated at 14, by means of screws 15. The body member 12 is pivotally mounted between the outwardly projecting legs 13a of the brackets 13, by means of a threaded stud 17, extending through aligned apertures formed in the legs 13a of the brackets, and the outer ends of the stud are provided with nuts 18. Interposed between the ends of the body member 12, and the inner faces of the legs 13a of the brackets are suitable friction washers 20, and interposed between the outer faces of the legs 13a of the brackets and the under side of the nuts 18 are spring washers 21.

It will now be apparent that the supporting arm 5 and any associated elements or parts carried thereby are adapted to be also moved about a vertical axis, which together with the pivoting about the horizontal axis, provides a universal connection for permitting adjustment of the arm to a desired vertical and horizontal position, for disposing the rear view mirror or other element at a most convenient or desired location.

It is to be understood that while I have herein shown and described the universal mounting for the supporting arm in the form of two transverse pivot connections, it will be manifest that other universal mountings may be employed, as for example a ball stud may be connected to a mounting surface and the cooperating ends of the arm 5 may be formed to frictionally embrace the ball, in a manner well understood in the art. For such use the two parts of the arm, as will hereinafter be described, may be conveniently urged together by a suitable clamping means, such as a bolt, in order to obtain the proper degree of frictional engagement with the ball. Inasmuch as the particular type of universal mounting forms no part of the present invention, it is deemed unnecessary to illustrate the ball stud type of universal connection.

Telescopically associated with the outer or free end of the supporting arm 5 is a tubular auxiliary arm 25, having its outer end flattened, as indicated at 26, for connection to a stud 27 projecting centrally from the rear surface of the mounting frame 28a of a mirror indicated at 28. As will hereinafter be described, the auxiliary supporting arm 25 is adapted to be secured in a desired position of adjustment with respect to the supporting arm 5 so that the mirror 28 may be disposed at a convenient position to afford proper rear vision of the roadway, when the supporting structure is mounted on a vehicle.

The present invention resides specifically in the novel form of supporting arm 5 which is of generally hollow tubular formation, and is composed of two main elements 31 and 32 of substantially semi-tubular cross section. These arm elements are formed as sheet metal stampings, so as to obtain maximum strength, and convenience in assembly, as well as economy in manufacture. Furthermore by reason of such construction, these arm elements may be conveniently handled for coating of their entire surfaces, interior and exterior, with suitable material for preventing oxidation, or other types of treatment, or plating or finishing.

In the construction illustrated in the drawings, the cooperating edges or joint surfaces of the two elements of the arm include joint surface portions, as indicated at 31a and 32a, adjacent the pivot end of the arm. These surface portions are relatively flat and are disposed in an outward, slightly acute angle to the normal plane of the cooperating intermediate joint surface portions, designated at 31b and 32b, of the respective arm elements 31 and 32. The cooperating joint surface portions as indicated at 31c and 32c, at the outer or free end of the arm, are also disposed in an outwardly inclined slightly acute angle with respect to the intermediate joint surface portions 31b and 32b of the respective arm elements.

It may be here mentioned that the arm elements may be of any desired cross sectional form, and as shown in the drawings, the major portions of the length thereof, when assembled together, are of generally rectangular cross section, and the outer or free end of the arm assembly is of generally circular cross-section, which merges by tapered sections 31e and 32e into the portions of rectangular cross section.

When the arm 5 is to be secured to a universal mounting of the type illustrated in the drawings, it is desirable, while not absolutely essential, that the elements 31 and 32 be permanently connected together, and for this purpose, I employ a bushing 35 extending through the aligned apertures 5b in the flattened portions 5a of the arm elements. The bushing is provided with an enlarged central portion as indicated at 36, adapted to abut against the inner surfaces of the flattened portions 5a, so as to constitute a spacer for maintaining the adjacent ends of the arm elements in proper spaced apart relation. The outer ends of the bushing 35 are flanged outwardly as indicated at 37, so as to in effect provide a rivet connection between the adjacent ends of said arm elements and the bushing 35. If desired, a simple tubular bushing may be employed in the same manner as above described, wherein the spacing of the arm elements is obtained by merely employing a suitable spacer member or washer over the tubular bushing.

When the pivotal ends of the arm elements are firmly secured together by the bushing 35, the joint surface portions 31a and 32a of the respective arm elements are brought into aligned contact as seen in Figure 6 of the drawings, and by virtue of which the cooperating intermediate joint surface portions of the arm elements, as indicated at 31b and 32b, assume a slight acute angle to each other in the form of a relatively narrow V-shaped slot, as seen in the drawings.

The free outer ends of the arm elements may then be connected together so as to dispose the cooperating intermediate joint surface portions 31b and 32b in aligned contact, as seen in Figure 7 of the drawings. For this purpose, I employ a locking collar as indicated at 40, which is fitted over the free ends of the arm elements 31 and 32 in abutting relation to the extreme end surface of the respective arm elements.

The locking collar is desirably of a size, so that it is only necessary in applying it to the ends of the arm elements to yieldingly compress the free or outer end portions of the outer end elements toward each other. The collar holds the free ends of the arm elements in such condition and also maintains the cooperating intermediate joint surface portions 31b and 32b in aligned contact with each other. In such position of the parts, the outer cooperating joint surface portions 31c and 32c are disposed in spaced-apart relation, forming a V slot, which at all times affords an additional range of movement of the extreme outer end portions of the arm elements toward each other for firmly gripping therebetween the auxiliary extension arm 25 associated with the mirror 28.

The locking collar 40 is retained in position on the arm elements by means of an aperture or depression as indicated at 41 which is adapted to register with an outwardly extending boss or projection 42 formed on one of the arm elements herein shown, as the arm element 32. It will therefore be apparent that when the extreme end portions of the arm elements are sufficiently compressed together, the collar 40 may be conveniently placed on or removed from the ends of the arm elements, but when placed in position, the resiliency of the arm elements serves to provide interlocking engagement with the collar to maintain it fixedly in position thereon.

Threaded in the opposite wall portion of the collar is a set screw 43, the end of which is adapted to seat against the external surface of the outer end portion of the arm element 31, so that further threading of the set screw in an inward direction causes the extreme end portion of the arm element 31 to be compressed toward the end portion of the other arm element 32, and thereby increases the frictional engagement of the inner surface of the elements 31 and 32 with respect to the auxiliary arm 25 associated with the mirror, for locking said auxiliary arm in a desired position of longitudinal and rotative adjustment in the supporting arm proper. When the set screw has been properly adjusted, it may be permanently secured in such position by means of a lock nut 44.

One of the arm elements, and as herein shown, the element 31 is formed at its outer edges with longitudinally extending, outwardly offset marginal portions 48, projecting substantially perpendicularly to and beyond the planes of the respective joint surface portions 31a and 31b of said arm element. As shown in the drawings, this marginal portion extends completely around the pivot end of said arm element. In general, it may be said that the marginal portion is of a Z-shaped section. When the arm elements 31 and 32 are connected with their joint surface portions disposed in cooperating relation, the marginal portion 48 of the arm element 31, as may be clearly seen in the drawings, projects substantially perpendicularly to and beyond the planes of the respective joint surface portions 32a and 32b of the arm element 32, and thus serves to overlap the joint formed by the joint surfaces of the two arm elements.

The marginal portion 48 preferably terminates intermediate the length of the semi-circular cross section of the arm element 31 adjacent the end of the locking collar 40 as seen in the drawings.

The Z-shaped marginal portions are herein shown overlapping the outer surfaces of the arm element 32, and it will be apparent that equally satisfactory results may be obtained by forming the marginal portion in the reverse manner, so as to lap the inner surface of said arm element 32.

The use of the marginal portion above-described permits forming the arm elements out of relatively light weight sheet metal, and results in obtaining greatly increased rigidity and strength of the arm in assembled condition. The marginal portions further serve to provide a substantially watertight supporting arm, while at the same time said marginal portions serve to absorb lateral strains tending to separate the arm elements in the plane of their joint connection. Moreover the marginal portions on the arm element 31 facilitate the assembly of the arm by permitting "nesting" of the arm elements preparatory to permanent assembly together.

While I have shown my novel arm structure, embodying the marginal portions, adapted to overlie the joint of the arm elements, and formed for mounting on a bracket having a pair of transverse, pivot connections constituting a universal joint, it will be apparent that if desired parts of the marginal portions at the closed end may be omitted, and the arm elements otherwise formed for use in conjunction with a ball stud type of universal mounting.

Although I have herein shown and described a preferred embodiment of my invention, manifestly it is capable of modification and re-arrangement of parts without departing from the spirit and scope thereof. I do not, therefore, wish to be understood as limiting this invention to the precise embodiment herein disclosed, except as it may be so limited by the appended claim.

I claim:

A device of the character described, comprising a bracket adapted to be secured to a mounting, an arm having one end formed for mounting on said bracket for friction retaining pivotal movement, and the other end of said arm being adapted for supporting a mirror or the like, said arm being formed of two sheet metal stamped elements of generally semitubular cross section, said elements having longitudinally extending joint surfaces adapted to be disposed in cooperating relation to substantially form a hollow tubular body, one of said elements including longitudinally extending, offset marginal portions at each side, projecting substantially perpendicularly to and beyond the planes of the respective joint surfaces of the other element and adapted to lap the joint surfaces of the other element, when said elements are disposed in cooperating relation, the joint surfaces of one of said elements, adjacent said one end, being relatively flat and disposed in a plane at a relatively slight acute angle to the remaining cooperating joint surfaces of said last-mentioned one element, and means carried on the other end of said elements for drawing said ends of the elements together, with the joint surfaces of both elements, adjacent said one end, disposed in abutting relation.

OLIVER C. RITZ-WOLLER.